United States Patent Office 3,189,521
Patented June 15, 1965

3,189,521
DIAMINO- AND TRIAMINO-S-TRIAZINES AS CHEMOSTERILANTS FOR INSECTS
Alexej B. Borkovec, Kensington, and Paul H. Terry, College Park, Md., assignors to the United States of America as represented by the Secretary of Agriculture
No Drawing. Filed Dec. 24, 1964, Ser. No. 421,126
15 Claims. (Cl. 167—33)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

Insect chemosterilants are chemical compounds which, when administered to an insect will make it sterile (i.e., incapable of producing offspring). When sterile insects are introduced into a population of normal, sexually reproducing insects, there will be a competition between the sterile and fertile individuals for a mate which will result in a decrease of the reproductive potential of the insect population. If the ratio of the sterile to fertile insects is made sufficiently large, a complete cessation of reproduction can be accomplished and the insect colony will die out.

An effective chemosterilant must have the following properties:
(a) Low toxicity toward the insect (i.e., all the important biological functions of the treated insect, with the exception of fertility, must remain the same or nearly the same as in untreated insects).
(b) High sterilizing activity (i.e., the sterilizing dosage must be substantially lower than the toxic or lethal dosage).
(c) Sufficient stability to allow formulation and application.
(d) High margin of safety to allow formulation and application without harmful effects on the environment.

From the practical point of view one additional criterion is of importance. In most of the economically important insects the male can mate with several females whereas the female mates usually only once. Therefore an effective chemosterilant must sterilize the males, or if possible both sexes.

Only one group of compounds has been hitherto known to approach the above-mentioned criteria. The compounds can be best described as biological alkylating agents, most importantly the derivatives of aziridine. Although the aziridinyl chemosterilants meet satisfactorily the criteria (a), (b), and (c), their potential mutagenic and general mitotic activity in warmblooded animals makes their safe practical application difficult and sometimes impossible, restricting their use to specially protected situations.

An object of the present invention is to provide chemosterilants effective with a diverse group of insect life.

Another object is to provide chemosterilants that have low toxicity toward both the insect to be controlled and the humans and other mammals that might be exposed to the chemosterilant.

A further object is to provide insect chemosterilants that have high sterilizing activity.

Still another object of the present invention is to provide insect chemosterilants of good chemical stabiilty and thus those materials which will retain their activity in the environment where applied.

According to the present invention sexual sterility in insects is obtained by contacting the insects with a compound selected from the group consisting of 2,4,6-tris(dimethylamino)-s-triazine and its hydrochloride salt, 2,4,6-tris(diethylamino)-s-triazine, 2,4,6-tris(methylamino)-s-triazine, 2 - amino - 4,6 - bis(dimethylamino)-s-triazine, 2,4-diamino-6-methoxy-s-triazine, 2,4-diamino-6-ethoxy-s-triazine, 2,4-diamino-6-dimethylamino-s-triazine hydrochloride, 2,4-diamino-6-pyrrolidinyl-s-triazine, and 2,4-diamino-6-morpholino-s-triazine.

Many of the above chemosterilants are derivatives of melamine, having from two to all six of the hydrogens of the amino functions replaced by methyl or ethyl. In the other compounds two of the amino functions are present as in melamine, but to the other carbon of the sym-triazine ring is attached an alkoxy, pyrrolidinyl or morpholino group instead of a third amino group.

These compounds are effective insect chemosterilants, have low toxicity to insects and mammals, and are stable in air as well as in dilute acids and bases at ambient temperatures.

The compounds are effective as insect sterilants by suppressing oviposition, by reducing or eliminating hatch of eggs, or by causing death of larvae which hatch from eggs laid by insects contacted by the compounds.

Various means of contacting the insect with a compound may be employed. The compounds are active as food additives, as residual coatings which the insects touch, by direct topical application to the insect body, or when injected into the insects. Topical applications are made with a suitable solution; usually in water or in an organic solvent such as alcohol or acetone.

Hexamethylmelamine and tetramethylmelamine are particularly effective chemosterilants. As demonstrated in Examples 1 and 7, only 0.05% in food completely prevents hatch of house fly eggs. When the chemosterilant is fed to females no eggs are laid. When fed to males, normal females cross-mated with these males produce eggs which do not hatch. This aspect is more clearly demonstrated in Example 2 where contact with hexamethylmelamine was by topical application.

The salt, hexamethylmelamine hydrochloride, is also highly effective, although a somewhat greater level of content in the food is required to obtain zero egg hatch. Example 3 demonstrates that the salt is effective also when contact is by injection of only a few micrograms of the compound per insect.

Other melamine derivatives effective as chemosterilants are illustrated in Examples 4, 5, 6 and 8. The data of Table IV in Example 8 shows that insect sterility, that is, inability of an insect to reproduce its kind, is obtained at a level of 0.01% of 2,4-diamino-6-dimethylamino-s-triazine hydrochloride in the food. Even when the fly laid eggs and the eggs hatched, the larvae are unable to pupate. Increasing the dosage of the chemical reduces or prevents hatching of eggs.

These aspects of chemosterilant activity are further illustrated in Examples 9 to 12 with compounds in which the chemical group at the 6-position of the s-triazine ring differs markedly from that of the compound of Example 8.

While chemosterilants are quite subjective in activity, those of the present invention are illustrated as effective with house flies (*Musca domestica*, L.), screw-worm flies (*Cochliomyia hominivorae* (Cqrl.)), and codling moth (*Carpocapsa pomonella*, L.), and the insects with which the chemicals are effective is not necessarily limited thereto, nor are the following examples presented in limitation of the processes of the present invention.

EXAMPLE 1.—CHEMOSTERILANT ACTIVITY OF HEXAMETHYLMELAMINE (2,4,6-TRIS(DIMETHYLAMINO)-S-TRIAZINE) ON HOUSE FLIES

Hexamethylmelamine was evaluated by topical application (males) and by the feeding method (both sexes). The results are summarized in Table I. The mortality of treated flies was in all cases equal to that of the controls.

*Table I.—House fly sterilizing effects of hexamethylmelamine*

TOPICAL APPLICATION

| Dosage | Egg Hatch (percent) |
| --- | --- |
| 10 µg./fly | 80 |
| 20 µg./fly | 62 |
| 40 µg./fly | 15 |
| 60 µg./fly | 0 |
| 80 µg./fly | 0 |

ORAL APPLICATION

| Dosage | Egg Hatch (percent) |
| --- | --- |
| 0.01% in food | 67 |
| 0.025% in food | 27 |
| 0.05% in food | 0 |
| 0.1% in food | 0 |
| 0.25% in food | 0 |

EXAMPLE 2.—CHEMOSTERILANT ACTIVITY OF HEXAMETHYLMELAMINE ON CODLING MOTH HEXAMETHYLMELAMINE ON CODLING MOTH

The compound was evaluated by topical application by applying a 10% aqueous solution to the abdomen of the adult male or female moth. Results are summarized in Table II.

*Table II.—Codling moth sterilizing effects of hexamethylmelamine*

| Dosage, µg./moth | Sex Treated | No. of Eggs | Percent Hatch | Longevity, Days |
| --- | --- | --- | --- | --- |
| 0 | | 600 | 79.6 | 10 |
| 75 | ♂ | 258 | 0 | 9.8 |
| 75 | ♀ | 77 | 33.8 | 10.4 |
| 100 | ♂ | 260 | 0 | 8.2 |
| 100 | ♀ | 0 | | 5.0 |
| 150 | ♂ | 100 | 0 | 6.4 |
| 150 | ♀ | 0 | | 6.2 |
| 200 | ♂ | 17 | 0 | 4.0 |
| 200 | ♀ | 0 | | 3.2 |
| 300 | ♂ | 25 | 0 | 4.8 |
| 300 | ♀ | 0 | | 3.6 |

EXAMPLE 3.—CHEMOSTERILANT ACTIVITY OF HEMAMETHYLMELAMINE HYDROCHLORIDE ON HOUSE FLIES

The compound was evaluated by the injection method (males) and by the feeding method (both sexes). The results are summarized in Table III. The mortality of treated flies was in all cases equal to that of the controls.

*Table III.—House fly sterilizing effects of hexamethylmelamine hydrochloride*

INJECTION METHOD

| Dosage | Egg Hatch (percent) |
| --- | --- |
| 2.5 µg./fly | 88 |
| 5.0 µg./fly | 53 |
| 10.0 µg./fly | 1 |
| 20.0 µg./fly | 0 |

ORAL APPLICATION

| Dosage | Egg Hatch (percent) |
| --- | --- |
| 0.25% in food | 79 |
| 0.5% in food | 0 |
| 1.0% in food | 0 |

EXAMPLE 4.—CHEMOSTERILANT ACTIVITY OF HEXAETHYLMELAMINE (2,4,6-TRIS(DIETHYLAMINO)-S-TRIAZINE) ON HOUSE FLIES

Flies fed a diet containing 0.5% of hexaethylmelamine in regular fly food produced no eggs. The mortality of the treated insects was 20%.

EXAMPLE 5.—CHEMOSTERILANT ACTIVITY OF $N^2,N^4,N^6$ - TRIMETHYLMELAMINE (2,4,6 - TRIS (METHYLAMINO) - S - TRIAZINE) ON HOUSE FLIES

Flies fed a diet containing 0.25% of 2,4,6-tris(methylamino)-s-triazine in food gave a normal number of eggs, 49% of which hatched; however, only 41% of the eggs produced larvae which pupated. When the flies were fed 0.50% of the compound in food, no oviposition occurred.

EXAMPLE 6.—CHEMOSTERILANT ACTIVITY OF $N^2,N^4,N^6$ - TRIMETHYLMELAMINE(2,4,6 - TRIS (METHYLAMINO) - S - TRIAZINE) ON SCREW-WORM FLIES

The addition of 1% of the compound in the flies' diet reduced the hatch to 50%; 31% of the flies died.

EXAMPLE 7.—CHEMOSTERILANT ACTIVITY OF $N^2,N^2,N^4,N^4$ - TETRAMETHYLMELAMINE (2-AMINO - 4,6 - BIS(DIMETHYLAMINO) - S - TRIAZINE) ON HOUSE FLIES

The addition of 0.05% of 2-amino-4,6-bis(dimethylamino)-s-triazine to the flies' diet reduced the egg hatch to 0%.

EXAMPLE 8.—CHEMOSTERILANT ACTIVITY OF $N^2,N^2$ - DIMETHYLMELAMINE HYDROCHLORIDE (2,4 - DIAMINO - 6 - DIMETHYLAMINO - S - TRIAZINE HYDROCHLORIDE) ON HOUSE FLIES

In feeding experiments the compound was mixed with the flies' diet. The results are summarized in Table IV.

*Table IV.—House fly sterilizing effects of 2,4-diamino-6-dimethylamino-s-triazine hydrochloride*

| Dosage | Percent Hatch | Percent Pupation |
| --- | --- | --- |
| 0.01% in food | 93 | 0 |
| 0.50% in food | 14 | 0 |
| 1.00% in food | 0 | 0 |

EXAMPLE 9.—CHEMOSTERILANT ACTIVITY OF 2,4 - DIAMINO - 6 - METHOXY - S - TRIAZINE ON HOUSE FLIES

Flies fed sugar containing 1% of the compound gave a normal number of eggs, 73% of which hatched; however, only 57% of the eggs produced larvae which pupated. Similarly 1% of the compound fed in sugar, dried milk, dried egg yolk mixture gave 46% hatch and 32% pupation.

EXAMPLE 10.—CHEMOSTERILANT ACTIVITY OF 2,4 - DIAMINO - 6 - ETHOXY - S - TRIAZINE ON HOUSE FLIES

In feeding experiments the compound was mixed with the flies' diet. The results are summarized in Table V.

*TABLE V.—House fly sterilizing effects of 2,4-diamino-6-ethoxy-s-triazine*

| Dosage | Percent Hatch | Percent Pupation |
| --- | --- | --- |
| 0.25% in food | 86 | 42 |
| 0.50% in food | 63 | 24 |
| 1.00% in food | 13 | 0 |

EXAMPLE 11.—CHEMOSTERILANT ACTIVITY OF 2,4 - DIAMINO - 6 - PYRROLIDINYL - S - TRIAZINE ON HOUSE FLIES

Flies fed 1% of the compound in food gave a normal number of eggs, 92% of which hatched; however, none of the eggs produced larvae which pupated.

EXAMPLE 12.—CHEMOSTERILANT ACTIVITY OF 2,4 - DIAMINO - 6 - MORPHOLINO - S - TRIAZINE ON HOUSE FLIES

Flies fed 0.01% of 2,4-diamino-6-morpholino-s-triazine in food gave a normal number of eggs, 67% of which hatched; however, none of the eggs produced larvae which pupated.

We claim:

1. A method of causing sexual sterility of an insect comprising contacting the insect with a compound selected from the group consisting of 2,4,6-tris(dimethylamino)-s-triazine, 2,4,6-tris(diethylamino)-s-triazine, 2-4-6,-tris(methylamino)-s-triazine, 2-amino-4,6-bis(dimethylamino)-s-triazine, 2,4-diamino-6-dimethylamino-s-triazine, 2,4-diamino-6-methoxy-s-triazine, 2,4-diamino-6-ethoxy-s-triazine, 2,4-diamino-6-pyrrolidinyl-s-triazine, and 2,4-diamino-6-morpholino-s-triazine and a hydrochloride salt thereof.

2. The method of claim 1 in which the insect is the house fly.

3. The method of claim 2 in which the compound is 2,4,6-tris(dimethylamino)-s-triazine.

4. The method of claim 2 in which the compound is 2,4,6-tris(diethylamino)-s-triazine.

5. The method of claim 2 in which the compound is 2,4,6-tris(methylamino)-s-triazine.

6. The method of claim 2 in which the compound is 2-amino-4,6-bis(dimethylamino)-s-triazine.

7. The method of claim 2 in which the compound is 2,4-diamino-6-dimethylamino-s-triazine.

8. The method of claim 2 in which the compound is 2,4-diamino-6-methoxy-s-triazine.

9. The method of claim 2 in which the compound is 2,4-diamino-6-ethoxy-s-triazine.

10. The method of claim 2 in which the compound is 2,4-diamino-6-pyrrolidinyl-s-triazine.

11. The method of claim 2 in which the compound is 2,4-diamino-6-morpholino-s-triazine.

12. The method of claim 1 in which the insect is the codling moth.

13. The method of claim 12 in which the compound is 2,4,6-tris(dimethylamino)-s-triazine.

14. The method of claim 1 in which the insect is the screw-worm fly.

15. The method of claim 14 in which the compound is 2,4,6-tris(methylamino)-s-triazine.

References Cited by the Examiner

UNITED STATES PATENTS

| | | | |
|---|---|---|---|
| 2,392,608 | 1/46 | Nagy | 260—249.6 |
| 2,909,420 | 10/59 | Gysin et al. | 71—2.5 |
| 2,909,421 | 10/59 | Gysin et al. | 260—249.6 |

JULIAN S. LEVITT, *Primary Examiner.*